United States Patent
Wang et al.

(10) Patent No.: US 7,860,813 B2
(45) Date of Patent: Dec. 28, 2010

(54) MONITORING DRIVING SAFETY USING SEMI-SUPERVISED SEQUENTIAL LEARNING

(75) Inventors: Jinjun Wang, San Jose, CA (US); Shenghuo Zhu, Santa Clara, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 408 days.

(21) Appl. No.: 12/184,221

(22) Filed: Jul. 31, 2008

(65) Prior Publication Data
US 2009/0191513 A1   Jul. 30, 2009

Related U.S. Application Data

(60) Provisional application No. 61/023,112, filed on Jan. 24, 2008, provisional application No. 61/045,301, filed on Apr. 16, 2008.

(51) Int. Cl.
G06F 15/18 (2006.01)

(52) U.S. Cl. ........................................ 706/12

(58) Field of Classification Search ............. 706/12–16, 706/25, 45, 62; 701/1, 23, 27, 59, 62, 63, 701/65, 76, 77, 92, 97, 98, 117; 434/29, 434/62–71
See application file for complete search history.

(56) References Cited

U.S. PATENT DOCUMENTS

| | | | |
|---|---|---|---|
| 6,937,994 B1 * | 8/2005 | Iyengar | 705/10 |
| 7,610,130 B1 * | 10/2009 | Dixon et al. | 701/36 |
| 2007/0219433 A1 * | 9/2007 | Stupp | 600/300 |

* cited by examiner

*Primary Examiner*—David R Vincent
(74) *Attorney, Agent, or Firm*—Paul Schwarz; Joseph Kolodka

(57) ABSTRACT

A computer-implemented method and system for predicting operation risks of a vehicle. The method and system obtains a training data stream of vehicular dynamic parameters and logging crash time instances; partitions the data stream into units representing dimension vectors, labels the units that overlap the crash time instances as most dangerous; labels the units, which are furthest from the units that are labeled as most dangerous, as most safe; propagates the most dangerous and the most safe labeling information of the labeled units to units which are not labeled; estimates parameters of a danger-level function using the labeled and unlabeled units; and applies the danger-level function to an actual data stream of vehicular dynamic parameters to predict the operation risks of the vehicle.

16 Claims, 3 Drawing Sheets

MONITORING DRIVING SAFETY USING SEMI-SUPERVISED SEQUENTIAL LEARNING

RELATED APPLICATIONS

This application claims the benefit of U.S. Provisional Application No. 61/023,112, filed Jan. 24, 2008 and U.S. Provisional Application No. 61/045,301, filed Apr. 16, 2008. The disclosures of U.S. Provisional Application Nos. 61/023,112 and 61/045,301 are incorporated herein by reference.

FIELD OF THE INVENTION

This invention relates to intelligent transportation systems, and more particular, to methods for mining dangerous and safe driving patterns from sequential data with substantially limited labeling information.

BACKGROUND OF THE INVENTION

The availability of on-board electronics and in-vehicle information systems has accelerated the development of more intelligent vehicles. One possibility is to automatically monitor a driver's driving performance to prevent potential risks. Although protocols to measure a driver's workload have been developed by both government agencies and the automobile industry, they have been criticized as being too costly and difficult to obtain. In addition, existing uniform heuristics for driving risk preventions do not account for changes in individual driving environments. Hence technologies for understanding a driver's frustrations to prevent potential driving risks has been listed by many international automobile companies as one of the key research areas for realizing intelligent transportation systems.

In the past decade, researchers have attempted to recognize a driver's vigilance level by exploring physiological and bio-behavioral signals such as the brain wave, heart rate, blood volume pulse and respiration, etc. Acquiring physiological data, however, is intrusive because some electrodes or sensors must be attached to the driver's body.

To develop non-intrusive driving safety monitoring systems, two sets of features have been explored. The first is to extract visual features that are correlated to a driver's fatigue state, such as the head pose, face direction, head/eye movement tracks, etc, using cameras, infrared LEDs, or multiple visual sensors. Unfortunately, these visual features can not always be acquired accurately or reliably due to large human/environment variations and the immaturity of current computer vision techniques. The other set of non-intrusive features relates to a vehicle's dynamic parameters, such as lateral positions, steering wheel movements, accelerations/decelerations, etc. Since these parameters can be extracted using hidden sensors, and are strong indicators of a driver's driving state, they are promising features, and have big potentials for developing driving safety monitoring systems.

The task of detecting driving risks can be modeled as an anomaly detection problem. The most straightforward way of detecting driving anomalies is to use rule-based approaches where a set of heuristic rules are defined to reflect potential driving risks, and any violations of one or more rules are detected as anomalies. Defining a comprehensive set of rules to cover all kinds of driving conditions/risks, however, is an extremely difficult, or almost impossible task. Therefore, many researchers have applied statistical modeling methods, such as Fisher's Linear Discriminant Analysis, Support Vector Machines, and Bayesian Networks, to name a few, to attempt to learn a statistical model which is able to classify any driving state into either a safe or a dangerous state, and claim the detection of a driving anomaly whenever a driving state is classified as dangerous. In order to obtain a model with good classification accuracy, it is critical to create a large amount of training data that contains sufficient samples of safe and dangerous driving states.

Classification-based methods have several inherit problems. First, it is very difficult to collect sufficient samples of dangerous driving states, because typical drivers are in safe driving states for most of a driving session. Therefore, it is very likely that one will get a training set with extremely unbalanced positive and negative samples. Second, there are no commonly agreed-upon criteria to draw a clear boundary between safe and dangerous driving states. Third, the entire driving state space is indeed a continuous space where states corresponding to driving accidents scatter in many places, and any transitions between safe and dangerous states occur rather continuously than discretely. Simple, clear boundaries do not exist in the driving state space for objectively separating the safe states from the dangerous states.

Accordingly, an improved method is needed for detecting motor vehicle driving risks, conditions, or anomalies, that avoid the problems of prior art methods.

SUMMARY

A computer-implemented method and system are disclosed for predicting operation risks of a vehicle. The method and system obtains a training data stream of vehicular dynamic parameters and logging crash time instances; labels training data in the training data stream that overlap the crash time instances as most dangerous; labels training data in the training data stream, which are furthest from the training data that are labeled as most dangerous, as most safe; propagates the most dangerous and the most safe labeling information of the labeled training data to training data in the data stream which are not labeled; estimates parameters of a danger-level function using the labeled and unlabeled training data; and applies the danger-level function to an actual data stream of vehicular dynamic parameters to predict the operation risks of the vehicle.

DETAILED DESCRIPTION OF THE INVENTION

A semi-supervised sequential learning method is described herein, which is capable of learning a danger-level estimation model or function $f(x)$ that may be used in a predicting method for measuring the danger-level of each driving state using a vehicle's dynamic parameters. The term "vehicle" includes without limitation, land, water, and air vehicles, however powered.

For the entire driving state, in one embodiment of the sequential learning method, it is assumed that: 1) states which correspond to driving accidents are the most dangerous states, and are assigned the highest danger-level; 2) states that are furthest from any accident states are the safest states, and are assigned the lowest danger-level; and 3) the danger-level of any other state is proportional to their spatio-temporal distances to the safe and accident states.

The sequential learning method estimates the danger-level model from training samples that satisfy the above three assumptions. The method requires labeling only the accident states and the safe states (safe states will be automatically discovered based on their distances to the accident states) in the training data, and learns an optimal model with respect to a predefined cost function. Since the cost function involves both the labeled and unlabeled driving states, the learning method is referred to as semi-supervised learning.

Compared to the classification-based approaches, the present method has several advantages. First, the present method dramatically simplifies the task of training data creation because it does not need to label those non-accident dangerous states, which is the most difficult, and subjective part of the labeling task. Second, the resulting model's performance accuracy will not be seriously affected by the unbalance between positive and negative training samples, because it is not based on any classification algorithms. Third, the resulting model has explicit parametric form such that it can be estimated with high efficiency. Fourth, the present method uses the vehicle's dynamic parameters, which are useful, but not intrusive. And finally, the present method's training strategy is more appropriate for modeling the continuous driving state space with very sparsely distributed accident states.

Figure 1:
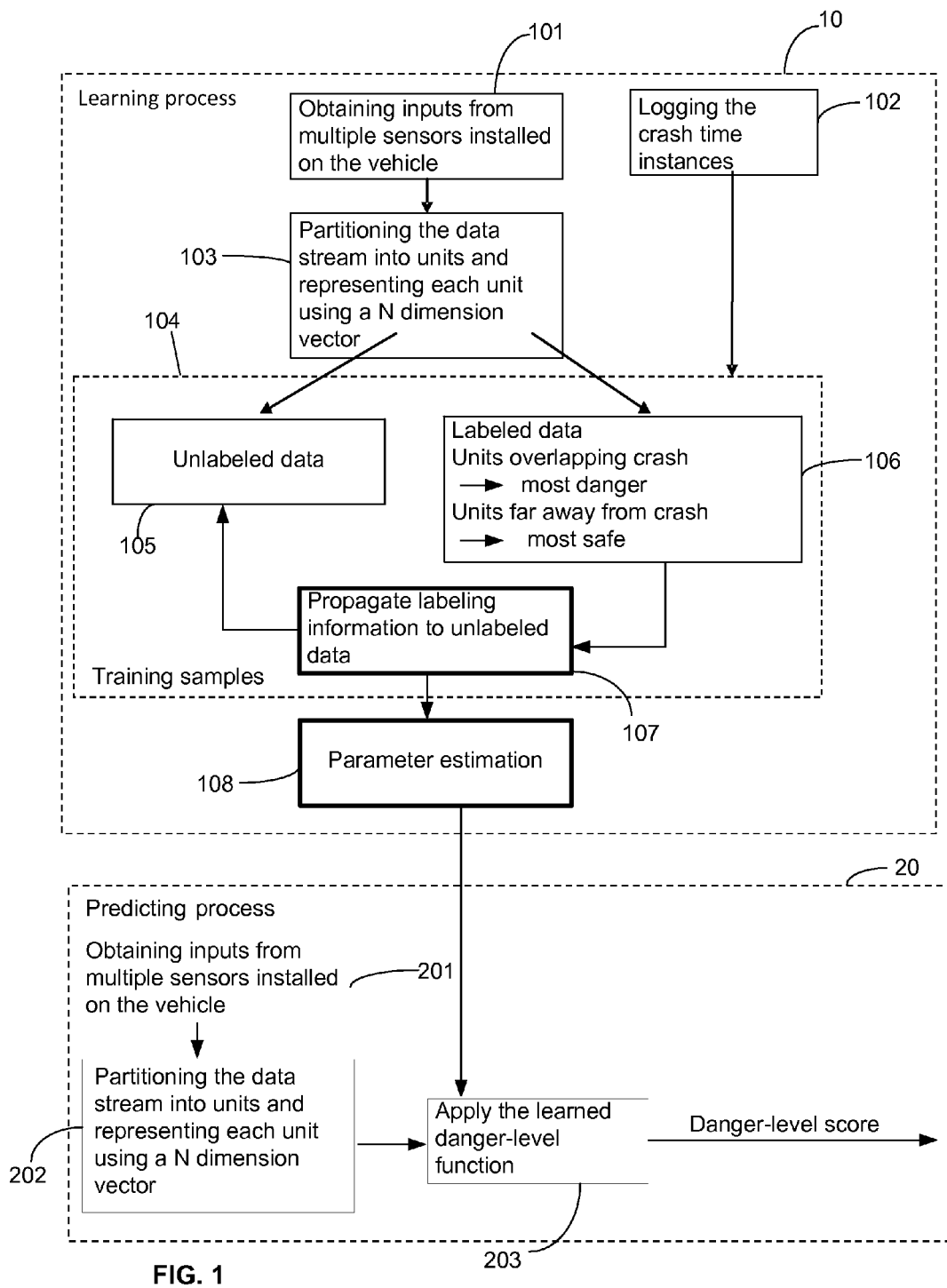
FIG. 1 is a flow chart outlining the semi-supervised sequential learning method and the predicting method.

Referring now to FIG. 1, there is shown a flowchart which outlines the semi-supervised sequential learning method 10 and the predicting method 20. The semi-supervised sequential learning method 10 is performed first, starting with box 101 where a plurality of inputs are obtained from multiple sensors of the vehicle, which are capable of continuously collecting the vehicle's dynamic parameters including, without limitation, lateral positions (driver's lateral lane position with respect to the roadway dividing line, positive to the right (feet)), steering wheel movements, accelerations, decelerations, speed, and distances to nearby objects. The multi-channel data streams generated by these sensors may be collected from multiple driving sessions with different drivers. Various driving accidents may be contained in the multi-channel sensor data streams, therefore, in box 102, the time instances of these accidents in the data streams are logged. To facilitate the data analysis, in box 103, all the data streams are partitioned into fixed length units i and each unit i is represented with a N-dimensional feature vector $x_i$.

In box 104, training sample set $\chi$ comprising an unlabeled data set U in box 105 and a labeled data set L in box 106 are generated from the data in boxes 102 and 103. The labeled data set L generated in box 106 includes those units i that are the most dangerous and those units i that are most safe. Because the time instance of every accident in the data stream logged in box 102 is known, the units i obtained from box 103 that overlap the accidents are identified as accident units (those units i that are the most dangerous) and labeled with the highest danger-level score $p_d$, in box 106. The units i obtained in box 103 with sufficiently large spatio-temporal distances to the accident units are identified as safe units (those units i that are most safe) and labeled with the lowest danger-level score $p_s$, in box 106. A simple heuristic may be used to identify the safe units units. The unlabeled data set U generated in box 105 includes the remaining units i that have unknown danger-level scores. As a result, the entire training data set $\chi$ can be denoted as $\chi = L \cup U$, where $L = \{(x_1 y_1),(x_2 y_2), \ldots, (x_{|L|}, y_{|L|})\}$ is the labeled data set, $y_i \in \{p_d\}$, $U = \{x_{|L|+1}, x_{|L|+|U|}\}$ is the unlabeled data set, and $|L| \ll |U|$.

In box 107, labeling information from the labeled training set L of box 106 is propagated to the unlabeled length units i of the unlabeled training set U of box 105 so that the entire training data set $\chi$, i.e., both the labeled training data set L and the unlabeled training data set U, can be used for training and building the danger-level estimation model or function $f(x)$ that can map each input feature vector x into a numerical danger-level score. Ideally, the danger-level estimation model or function $f(x)$ should be capable of generating low danger-level scores for normal driving states and high scores for dangerous ones. To learn a danger-level estimation model or function $f(x)$ that approaches the ideal one, the sequential learning method stipulates that $f(x)$ must satisfy the following two principles: (1) for labeled feature vectors $X_1 \in L$, the estimated danger-level scores $f(x_i)$ must be as close to $y_i$ as possible; and (2) for all the feature vectors $x_j, x_k \in \chi$ that neighbors each other, the difference between the estimated danger-level scores $f(x_i)$ and $f(x_k)$ must be proportional to the spatio-temporal distances between $x_j$ and $x_k$. Because model $f(x)$ is learned from both the labeled and the unlabeled training data sets L and U, the sequential learning method is considered semi-supervised. The present method dramatically simplifies the training data creation task because it does not need to label every feature vectors x. Furthermore, in contrast to the sequential classification approaches where the Hidden Markov Model (HMM), Conditional Random Field (CRF), etc, can be applied to classify data segments into discrete safe/dangerous classes, the present method produces a model that estimates a numerical danger-level score for each feature vector. Such an approach is more appropriate for modeling the driving anomaly detection problem where the entire driving state space is continuous rather than discrete.

Figure 2:
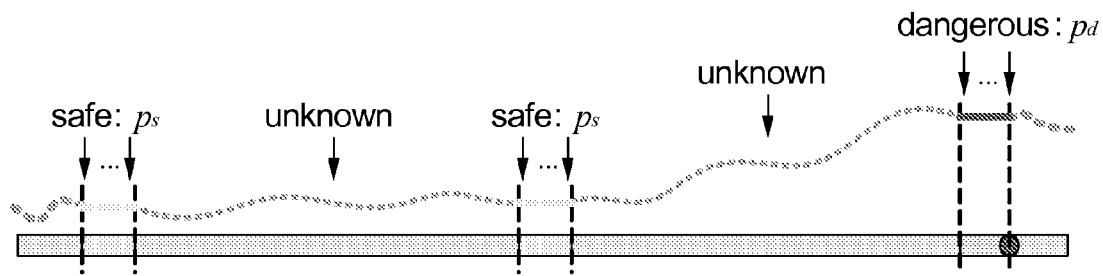
FIG. 2 is a chart that graphically shows a first method for propagating the labeling information from a labeled training set to an unlabeled training set.

FIG. 2 graphically shows a first method for propagating the labeling information from the labeled training set L to the unlabeled training set U. As shown in FIG. 2, the danger-level values or scores of the dangerous units i and the safe units i in the labeled data set L are propagated to the unlabeled data set U according to the similarity between neighboring units i (i.e., the similarity between neighboring feature vectors).

Figure 3:
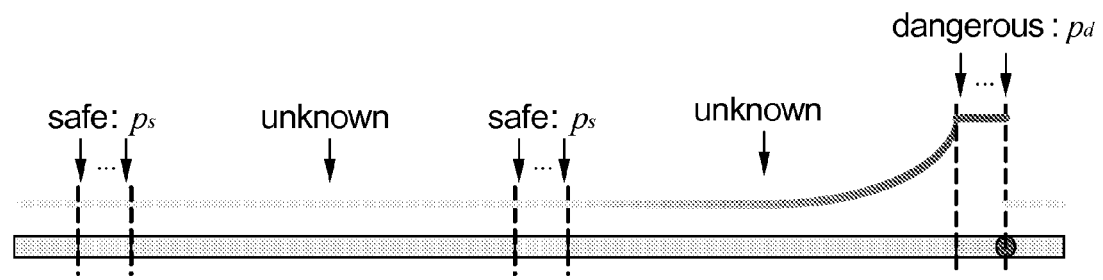
FIG. 3 is a chart that graphically shows a second method for propagating the labeling information from a labeled training set to an unlabeled training set.

FIG. 3 graphically shows a second method for propagating the labeling information from the labeled training set L to the unlabeled training set U. As shown in FIG. 3, the danger-level values or scores of the dangerous units i and the safe units i in the labeled data set L are propagated to the unlabeled data set U according to a predefined decaying factor between neighboring units i.

Referring again to FIG. 1, after propagation, the entire training data set $\chi$ of box 104 (the labeled training data set L and unlabeled training data set U) may be used in box 108 for estimating the parameters of the danger-level estimation model or function $f(x)$. Parameter estimation may be performed by formulating a cost function into a quadratic form, selecting a parametric form for the danger-level estimation model or function $f(x)$, and estimating the parameters of the danger-level estimation model or function $f(x)$ function by minimizing the quadratic cost function.

Referring still to FIG. 1, the learned danger-level estimation model or function $f(x)$ may now be used in the predicting method 20 for measuring the danger-level of each driving state using the vehicle's dynamic parameters as measured by the vehicle's sensors. More specifically, a plurality of inputs are obtained from the multiple sensors of the vehicle as a driver operates a vehicle (the same vehicle used for obtaining the training data or another vehicle) in box 201. These inputs include without limitation lateral positions, steering wheel movements, accelerations, decelerations, speed, and distances to nearby objects, as the driver operates the vehicle.

In box 202, all the sensor data streams are partitioned into fixed length units i and each unit i is represented with a N-dimensional feature vector $x_i$.

In box 203, the learned danger-level estimation model or function $f(x)$ is applied to the unlabeled units i obtained in box 202 to generate a danger-level score for each unit i. The danger-level scores may then be applied to an alert/warning device mounted in the vehicle to provide a visual and/or audible alert or warning to the driver that he or she is driving in a safe or dangerous manner (the methods described herein may be performed by the alert/warning device or some other device, apparatus, and/or system). In addition, or alternatively, the danger-level scores may be used by one or more vehicle control systems such as an anti-skid system, a traction control system, a cruise control system, an emergency braking system, to name a few, to automatically take command over the entire or partial operation of the vehicle to avoid an accident, e.g., brake the vehicle, accelerate the vehicle, alter the vehicle's direction, etc.

One skilled in the art will recognize that any suitable computer system may be used to execute the methods disclosed herein. The computer system may include, without limitation, a mainframe computer system, a workstation, a personal computer system, a personal digital assistant (PDA), or other device, apparatus, and/or system having at least one processor that executes instructions from a memory medium.

The computer system may further include a display device or monitor for displaying operations associated with the methods described herein and one or more memory mediums on which one or more computer programs or software components may be stored. For example, one or more software programs which are executable to perform the methods described herein may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The methods described herein may also be executed in hardware, a combination of software and hardware, or in other suitable executable implementations. The methods implemented in software may be executed by the processor of the computer system or the processor or processors of the one or more associated computers or computer systems connected to the computer system.

Figure 4:
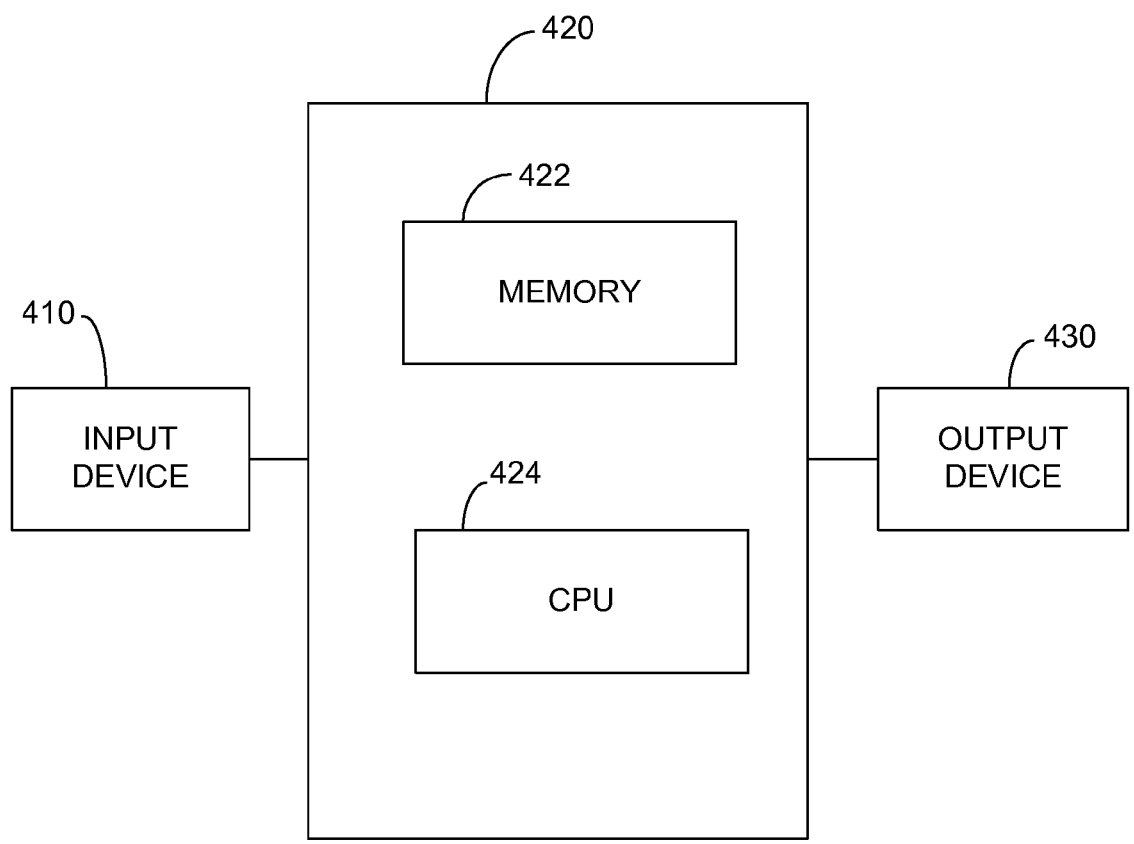
FIG. 4 is a block diagram of an exemplary embodiment of a driving safety monitoring system for performing the methods described herein.

FIG. 4 is a block diagram of an exemplary embodiment of a driving safety monitoring system 400 for performing the methods described herein. The system 400 includes an input device 410, one or more processors 420 (only one shown), and an output device 430. The input device 410 inputs the vehicle sensor data into the processor 420. The processor 420 includes a memory 422 that stores programmed instructions for executing the methods described herein. The processor 420 further includes a Central Processing Unit (CPU) 424 for executing the program instructions. The output device 430 outputs the danger-level scores in a form which is usable by the driver alert/warning device and/or vehicle control system(s).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A computer-implemented method for predicting operation risks of a vehicle, the method comprising the steps of:
   obtaining a training data stream of vehicular dynamic parameters and logging crash time instances;
   labeling training data in the training data stream that overlap the crash time instances as most dangerous;
   labeling training data in the training data stream, which are furthest from the training data that are labeled as most dangerous, as most safe;
   propagating the most dangerous and the most safe labeling information of the labeled training data to training data in the data stream which are not labeled;
   estimating parameters of a danger-level function using the labeled and unlabeled training data; and
   applying the danger-level function to an actual data stream of vehicular dynamic parameters to predict the operation risks of the vehicle.

2. The method of claim 1, further comprising the step of partitioning the training data stream into a plurality of units prior to the labeling steps, each of the units comprising the training data in the training data stream.

3. The method of claim 2, wherein each of the units represents a dimension vector.

4. The method of claim 1, wherein the parameter estimating step comprises the step of formulating a cost function into a quadratic form.

5. The method of claim 4, wherein the parameter estimating step further comprises the step of applying a parametric form for the danger-level function.

6. The method of claim 5, wherein the parameter estimating step further comprises the step of minimizing the cost function.

7. The method of claim 1, wherein the parameter estimating step comprises the step of applying a parametric form for the danger-level function.

8. The method of claim 1, wherein the parameter estimating step comprises the step of minimizing a cost function.

9. The method of claim 1, wherein the propagating step is performed by similarity propagation.

10. The method of claim 1, wherein the propagating step is performed by auto-regression propagation.

11. The method of claim 1, wherein the training data stream of vehicular dynamic parameters and the logging crash time instances are obtained from at least one vehicle sensor.

12. The method of claim 11, wherein the at least one vehicle sensor is associated with the vehicle and wherein actual data stream of vehicular dynamic parameters to predict operation risks of the vehicle is obtained from the at least one vehicle sensor.

13. The method of claim 1, wherein the actual data stream of vehicular dynamic parameters to predict operation risks of the vehicle is obtained from at least one vehicle sensor.

14. The method of claim 1, further comprising the step of alerting a driver of if a predicted operation risk of the vehicle has a dangerous risk value or score.

15. The method of claim 1, further comprising the step of engaging a computerized vehicle control system of the vehicle if a predicted operation risk of the vehicle has a dangerous risk value or score.

16. A driving safety monitoring system for predicting operation risks of a vehicle, the system comprising:
   an input for obtaining a training data stream of vehicular dynamic parameters and logging crash time instances;
   a processor executing instructions for:
      labeling training data in the training data stream that overlap the crash time instances as most dangerous;
      labeling training data in the training data stream, which are furthest from the training data that are labeled as most dangerous, as most safe;
      propagating the most dangerous and the most safe labeling information of the labeled training data to training data in the data stream which is not labeled;
      estimating parameters of a danger-level function using the labeled and unlabeled training data; and
      applying the danger-level function to an actual data stream of vehicular dynamic parameters to predict vehicle operation risks; and,
   an output for outputting a predicted operation risk factor or score of the vehicle.

* * * * *